Patented Nov. 15, 1949

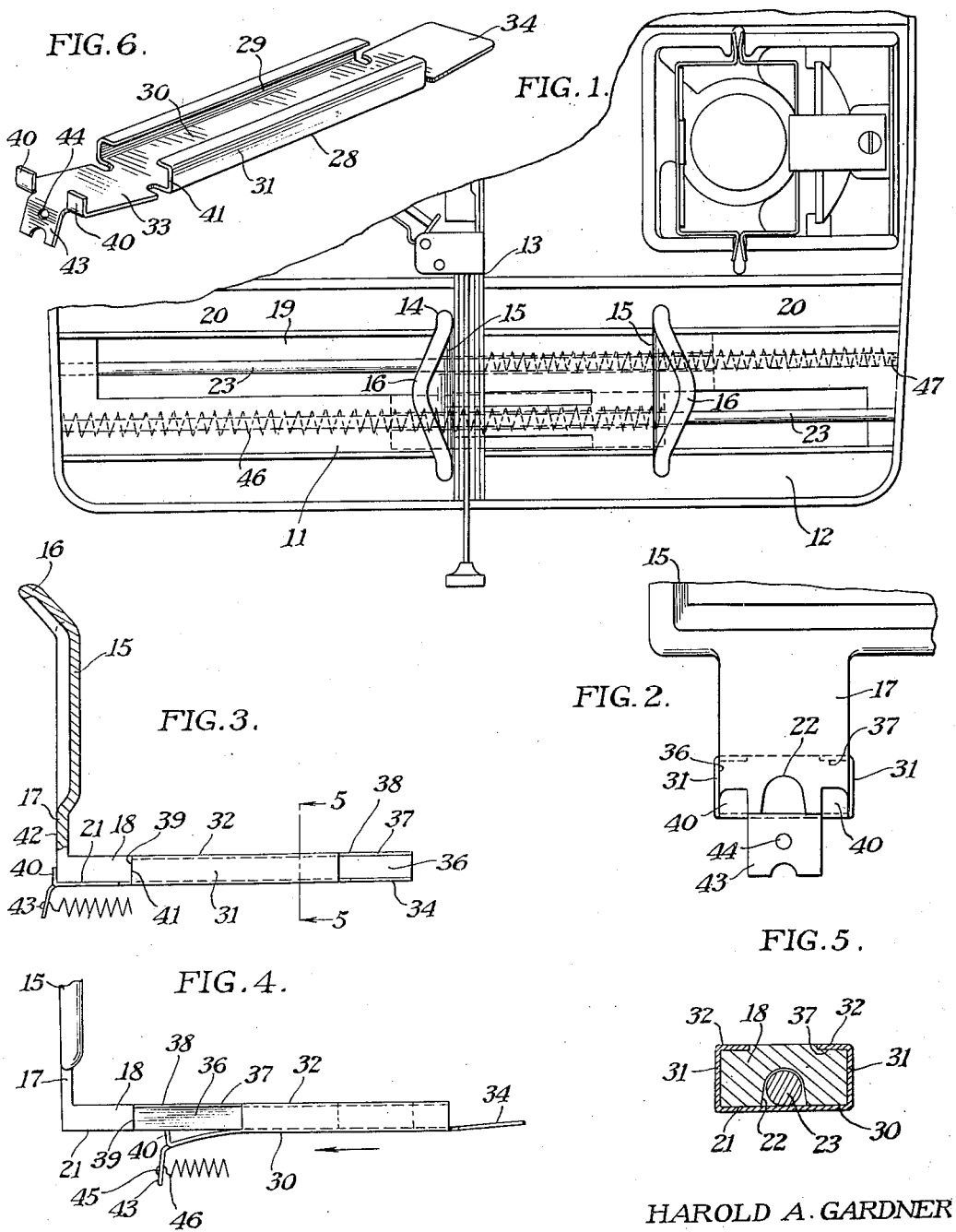
HAROLD A. GARDNER
INVENTOR

2,487,862

UNITED STATES PATENT OFFICE 2,487,862

SLIDE FOLLOWER FOR SLIDE PROJECTORS

Harold A. Gardner, Rochester, N. Y., assignor to Eastman Kodak Company, Rochester, N. Y., a corporation of New Jersey Application August 4, 1948, Serial No. 42,413

9 Claims. (Cl. 88—28)

The present invention relates to a slide projecting apparatus and more particularly to a slide follower mechanism therefor.

As is well known, some forms of slide projectors are provided with a magazine in which a group of slides is positioned before and/or after projection. A follower engages the rearmost slide in the magazine to retain the group in stacked relation therein and is mounted for sliding movement along the magazine to hold it yieldably in engagement with said rearmost slide.

The invention has as its principal object the provision of a novel and simple arrangement for securing the follower to its positioning and guiding means.

A further object of the invention is the provision of a securing mechanism which is positioned accurately on and is connected detachably to the follower.

A still further object of the invention is the provision of a securing mechanism of the type described which is simple, inexpensive to manufacture, easy to apply and highly effective in its results.

To these and other ends the invention resides in certain improvements and combinations of parts, all as will be hereinafter more fully described, the novel features being pointed out in the claims at the end of the specification.

In the drawings:

Fig. 1 is a partial plan view of one type of a projector, showing the slide magazines and the slide followers positioned therein;

Fig. 2 is an end view of one of the slide followers, showing the relation thereto of a connecting and securing device constructed in accordance with the present invention;

Fig. 3 is a side view of the follower and the connecting device illustrated in Fig. 2, with the device in its operative position;

Fig. 4 is a partial side elevation view of the structure illustrated in Fig. 3, showing the connecting device in its partially assembled position;

Fig. 5 is a vertical sectional view taken substantially on line 5—5 of Fig. 3, showing the relation of the follower and the connecting device and how the latter retains the follower in operative relation with its supporting member or rod; and Fig. 6 is a perspective view of the connecting device detached from the follower.

Similar reference numerals throughout the various views indicate the same parts.

Fig. 1 of the drawings shows a slide projector formed with a pair of slide receiving magazines 11 and 12 adapted to receive a plurality or group of slides to be projected. As such slides are of well known construction and do not constitute a part of the present invention, they are not illustrated or described. One of the magazines may be the supply magazine to hold the slide prior to projection and the other magazine is to hold the slide after projection and is commonly known as a take-up magazine. The slides are moved successively out of the supply magazine and into projecting position by a slide-changing mechanism generally indicated by the numeral 13. After a slide has been projected, it is moved by the slide-changing mechanism 13 into the take-up magazine. As the slide changer and magazine arrangement may be of any suitable and well known construction and do not constitute a part of the present invention, further details are not deemed necessary.

Each magazine is provided with a slide follower which is adapted to be held yieldably in engagement with the rearmost slide in the magazine to retain the slides in stacked relation therein, as is well known. As both followers are identical in structure, only one will be discussed in detail. Such a follower is shown generally at 14, Fig. 1, and comprises a vertical portion 15 adapted to engage the rearmost slide and terminating in an upper-bent back portion 16 by which the follower may be grasped and moved to the rear of the magazine to permit slides to be inserted therein, as is deemed apparent. The portion 15 is provided with a depending leg 17 which is connected to a horizontal extending foot 18 which fits into and slides in a slot 19 formed in the bottom 20 of the magazine, as shown in Fig. 1. The underside 21 of foot 18 is formed with an open slot 22 which is adapted to receive a rod 23 positioned either in the slot 19 or slightly therebelow. Thus, the foot 18 rests on and is guided and supported by the rod 23, as is best shown in Fig. 5. By means of this arrangement, the slide-engaging portion 15 is retained and supported in proper position and is spring-pressed, as will be later described, so as always to engage the rearmost slide yieldably to retain the slides in proper relation in the magazine.

In order to retain the follower on the rod 23, obviously some means must be provided to close the slot 22, as is apparent from an inspection of Fig. 5. Prior to the present invention, a plate was riveted to the under side 21 of the foot 18. Such an arrangement was costly to assemble. In order to overcome this difficulty, the present invention provides a novel and simple device releasably secured to the foot 18 for connecting the latter in assembled relation on the rod 23. This connecting means or device is in the form of a shoe broadly designated by the numeral 28, and best shown in Fig. 6. This shoe is formed from a piece of sheet metal bent to form a channel portion 29 having a bottom 30, side walls 31, the upper edges of which are bent inwardly to form overhanging flanges 32 which are parallel to and spaced from the bottom 30, as best shown in Figs. 5 and 6. A pair of resilient tongues 33 and 34 extend from opposite ends of the bottom and these tongues are bent up slightly out of the plane of the bottom so as to render them slightly resilient or flexible. The sides 36 of the foot 18 are cut away to a width equal to the distance between the sides 31 of the shoe 28. Also, the marginal edges 37 of the top 38 of the foot are cut away to receive the flanges 32, as best shown in Fig. 5. These cut-away portions terminate in a shoulder 39, the purpose of which will be later described.

In assembling, the shoe 28 is slid onto the foot 18 from the right as shown in Fig. 4, the channel portion 29 engaging the cut-away sides and top of the foot, as illustrated in Fig. 5. The left end of the tongue 33, as viewed in Figs. 3 and 4 and 6, is formed with a pair of spaced upstanding ears 40 which slide along the under surface 21 of the foot 18, the tongue 33 being bent or flexed, as best shown in Fig. 4. However, as the shoe is gradually slid to the left, the ends 41 of the sides 31 finally engage the shoulder 29 which limits further movement of the shoe. Substantially simultaneous with such engagement, the ears 40 pass beyond the left end 42 of the foot 18 and the ears 40, due to the flexed tongue 33, now snap into engagement with the end 42 and cooperate with the ends 41 and shoulder 29 to maintain the shoe 28 releasably in position on the foot 18. At this time, the resilient tongues 33 and 34 yieldably engage the underside 21 of the foot 18. It will now be apparent from an inspection of Fig. 5 that the bottom 30 of the shoe closes the slot 22 in the foot 18 to maintain the rod 23 in position in slot 22 to support and guide the follower on rod 23. When it is desired to detach the shoe, the left end of the tongue 33 is depressed to disengage the ears 40 from the end 42, and the shoe may then be slid to the right to disengage it from the foot 18, as is deemed apparent from an inspection of Figs. 3 and 4.

Intermediate the ears 40, the end of the tongue 33 is formed with a bent-down lug 43, as best shown in Fig. 6. This lug is formed with an opening 44 adapted to receive one end of a coil spring 46, the other end 47 of which is anchored to the apparatus. Thus, the spring yieldably urges the follower against the slides in the magazine, as will be apparent. When the magazine is to be filled, the portion 15 of the follower is pulled back by means of the finger portion 16. Such movement elongates and tensions the spring 46. When the slides are in position in the magazine, the portion 16 is released and the spring 46 then moves the follower along the magazine until it finally engages the rearmost slide to hold the slide in stacked position and to urge the slides towards the slide-changing mechanism.

It will be apparent from the above description that the present invention provides a novel and simple device for connecting the follower detachably to its supporting and guiding rods.

Also the device may be readily and easily assembled on or detached from the follower. Furthermore, the device is simple, inexpensive to manufacture, easy to apply and highly effective in use.

While one embodiment of the invention has been disclosed, it is to be understood that the inventive idea may be carried out in a number of ways. This application is, therefore, not to be limited to the precise details described, but is intended to cover all variations and modifications thereof falling within the scope of the appended claims.

What I claim and desire to be secured by Letters Patent of the United States of America is:

1. In a projecting apparatus, the combination with a magazine adapted to receive and position a plurality of slides, a spring-pressed follower positioned in said magazine and engaging the rearmost slide therein, a guide for said follower, of means for connecting said follower to said guide, said means comprising a channel shaped shoe slidably engaging a portion of said follower, and means for connecting said shoe yieldably and detachably to said portion.

2. In a projecting apparatus, the combination with a magazine adapted to receive and position a plurality of slides, a spring-pressed follower positioned in said magazine and engaging the rearmost slide therein, a guide for said follower, of means for connecting said follower to said guide, said means comprising a channel shaped shoe slidably engaging a portion of said follower, means including a resilient part on said shoe for positioning said shoe on said portion, and yieldable means for connecting said shoe yieldably and detachably to said portion.

3. In a projecting apparatus, the combination with a magazine adapted to receive and position a plurality of slides, a spring-pressed follower positioned in said magazine and engaging the rearmost slide therein, a guide rod extending the length of said magazine, a slotted foot on said follower engaging said rod to guide and support said follower, of means for connecting said foot to said rod, said means comprising a shoe for closing the slot in said foot, means for connecting the shoe detachably to said foot, and means for positioning said shoe on said foot.

4. In a projecting apparatus, the combination with a magazine adapted to receive and position a plurality of slides, a spring-pressed follower positioned in said magazine and engaging the rearmost slide therein, a guide rod extending the length of said magazine, a slotted foot on said follower engaging said rod to guide and support said follower, of means for connecting said foot to said rod, said means comprising a shoe for closing the slot in said foot, resilient portions formed on said shoe and engaging said foot to connect said shoe releasably thereto, and means for positioning said shoe on said foot.

5. In a projecting apparatus, the combination with a magazine adapted to receive and position a plurality of slides, a spring-pressed follower positioned in said magazine and engaging the rearmost slide therein, a guide rod extending the length of said magazine, a slotted foot on said follower engaging said rod to guide and support said follower, of means for connecting said foot to said rod, said means comprising a shoe formed with a channel portion slidably engaging said foot and closing the slot therein to connect said foot to said rod, resilient portions on said shoe engaging said foot to connect said shoe releasably thereto, and cooperating means on said foot and shoe for positioning the latter on said foot.

6. In a projecting apparatus, the combination with a magazine adapted to receive and position a plurality of slides, a spring-pressed follower positioned in said magazine and engaging the rearmost slide therein, a guide rod extending the length of said magazine, a depending foot formed on said follower and extending lengthwise of said magazine, said foot having the underside thereof formed with an open slot adapted to receive said rod to position said foot thereon, of means for connecting said foot to said rod, said means comprising a shoe formed with a channel-shaped portion slidably engaging said foot and closing the slot therein, means for positioning said shoe on said foot, and means for connecting said shoe releasably to said foot.

7. In a projecting apparatus, the combination with a magazine adapted to receive and position a plurality of slides, a spring-pressed follower positioned in said magazine and engaging the rearmost slide therein, a guide rod extending the length of said magazine, a depending foot formed on said follower and extending lengthwise of said magazine, said foot having the under side thereof formed with an open slot adapted to receive said rod to position said foot thereon, of means for connecting said foot to said rod, said means comprising a shoe formed with a channel-shaped portion slidably engaging said foot and closing the slot therein, a flexible tongue formed on said shoe, and ears formed on said tongue and adapted to snap over an end of said foot to position said shoe thereto and to connect said shoe releasably to said foot.

8. In a projecting apparatus, the combination with a magazine adapted to receive and position a plurality of slides, a spring-pressed follower positioned in said magazine and engaging the rearmost slide therein, a guide rod extending the length of said magazine, a depending foot formed on said follower and extending lengthwise of said magazine, said foot having the under side thereof formed with an open slot adapted to receive said rod to position said foot thereon, of means for connecting said foot to said rod, said means comprising a shoe formed with a channel-shaped portion slidably engaging said foot and closing the slot therein, said foot having a longitudinal groove formed therein to receive said channel portion, a shoulder formed at one end of said groove, a resilient tongue formed on said channel portion, and ears formed on said tongue and adapted to snap over an end of said foot to connect said shoe releasably to said foot, an end of said channel portion engaging said shoulder and cooperating with said ears to position said shoe on said foot.

9. In a projecting apparatus, the combination with a magazine adapted to receive and position a plurality of slides, a follower positioned in said magazine and yieldably engaging the rearmost slide therein, a guide rod positioned below and extending lengthwise of said magazine, a depending foot formed on said follower and having the under side thereof provided with an open slot to receive said rod to support said foot and follower thereon, of means for connecting said foot to said rod, said means comprising a shoe formed with a channel portion having a bottom adapted to overlie the under side of said foot to close said slot to connect the foot to said rod, said foot having a groove to slidably receive said channel portion, a shoulder formed at the inner end of said groove, a resilient tongue forming as an extension of said bottom, upturned ears formed on the end of said tongue and adapted to snap over an end of said foot to connect said shoe releasably to said foot and to cooperate with said shoulder to position the shoe on said foot, a spring extending lengthwise of said magazine and having an end anchored to said apparatus, and a downturned ear formed on said tongue to receive the other end of said spring to hold said follower yieldably against said rearmost slide.

HAROLD A. GARDNER.

REFERENCES CITED

The following references are of record in the file of this patent:

UNITED STATES PATENTS

| Number | Name | Date |
| --- | --- | --- |
| 1,159,681 | Kastner | Nov. 9, 1915 |
| 2,353,888 | Fuge | July 18, 1944 |